United States Patent
Shim et al.

(10) Patent No.: US 9,329,428 B2
(45) Date of Patent: May 3, 2016

(54) DISPLAY PANEL HAVING ANTI-STATIC FEATURE AND METHOD FOR MANUFACTURING THE SAME

(71) Applicant: Samsung Display Co., LTD., Yongin, Gyeonggi-Do (KR)

(72) Inventors: Yi-Seop Shim, Suwon-si (KR); Soo-Hye Ryu, Yongin-si (KR); Chang-Soon Jang, Seoul (KR); Chul Huh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 454 days.

(21) Appl. No.: 13/826,997

(22) Filed: Mar. 14, 2013

(65) Prior Publication Data

US 2014/0002903 A1 Jan. 2, 2014

(30) Foreign Application Priority Data

Jun. 28, 2012 (KR) ........................ 10-2012-0069796

(51) Int. Cl.
*G02B 27/00* (2006.01)
*G02F 1/1335* (2006.01)
*G02B 5/20* (2006.01)
*G02F 1/1333* (2006.01)

(52) U.S. Cl.
CPC ............ *G02F 1/133514* (2013.01); *G02B 5/20* (2013.01); *G02F 1/1333* (2013.01); *G02F 1/133509* (2013.01); *G02F 1/133512* (2013.01); *G02F 2001/133388* (2013.01); *G02F 2202/22* (2013.01)

(58) Field of Classification Search
None
See application file for complete search history.

(56) References Cited

U.S. PATENT DOCUMENTS

| | | | |
|---|---|---|---|
| 2005/0057708 A1* | 3/2005 | Kuo et al. | 349/106 |
| 2011/0181817 A1 | 7/2011 | Jung | |
| 2013/0188111 A1* | 7/2013 | Koito et al. | 349/58 |
| 2015/0092129 A1* | 4/2015 | Yamaguchi et al. | 349/42 |

FOREIGN PATENT DOCUMENTS

| | | |
|---|---|---|
| JP | 2001-183647 | 7/2001 |
| KR | 0707035 | 4/2007 |
| KR | 0729766 | 6/2007 |

* cited by examiner

*Primary Examiner* — Arnel C Lavarias
(74) *Attorney, Agent, or Firm* — Innovation Counsel LLP (57) ABSTRACT

A display panel includes a first substrate and a spaced apart second substrate and a protection or other additional film attached to an outer and laterally extending major surface of the first substrate. The first substrate includes a first base substrate having a major lateral surface subdivided into a display region and a peripheral region, a color filter member disposing on the first base substrate and having a plurality of color filters, a light blocking member disposing on the peripheral region of the first base substrate and an overcoating member disposing on the color filter member and on the light blocking member and extending to cover a sidewall surface of the light blocking member. The extend overcoating member helps block charged particles from reaching the light blocking member, thus preventing discoloration of the color filter due to influx of static electricity associated with the charged particles.

12 Claims, 7 Drawing Sheets

DISPLAY PANEL HAVING ANTI-STATIC FEATURE AND METHOD FOR MANUFACTURING THE SAME

PRIORITY STATEMENT

This application claims priority under 35 U.S.C. §119 to Korean Patent Application No. 10-2012-0069796, filed on Jun. 28, 2012 in the Korean Intellectual Property Office (KIPO), the contents of which application are incorporated by reference herein in their entirety.

BACKGROUND

1. Field of Disclosure

The present disclosure of invention relates to a display panel and a method for manufacturing the display panel. More particularly, the present disclosure relates to a display panel decreasing influx of static electricity and a method for manufacturing the display panel.

2. Description of Related Technology

A liquid crystal display (LCD) apparatus typically displays an image by using an optical characteristic of a liquid crystal where different light transmittance ratios are achieved according to applied electrical fringe fields. Thus, the typical liquid crystal apparatus comprises a display panel displaying an image and a backlight unit supplying backlighting light to the display panel. The display panel comprises a plurality of pixel units, each of the pixel units comprises a respective color filter defining a base color for the respective pixel unit. Generally, a desired color is formed by mixing three primary colors (e.g., RGB) or more (e.g., RGBWCY) at appropriate and respective luminances. The light supplied from the backlighting unit (e.g., a white light) is caused to express a desired color for a respective pixel unit by passing it selectively through each of plural and differently colored pixels. To display a desired color, a repeating cell is defined and used to populate a display area (DA) of the LCD device in a tessellating manner where each repeat cell comprises each of the basic colors (e.g., RGB), and is able to a generate a desired mix of its basic colors.

Thus, to express the desired color, in one class of LCD devices, a multi-colored color filter layer is necessary. During mass production fabrication, the color filter layer is disposed on a substrate of the display panel. In one particular class of embodiments, the color filter layer is present (pre-deposited) at basically the same time (simultaneously) as when a liquid crystal material layer of the display apparatus is provided. Generally, when manufacturing the liquid panel of this type, the liquid crystal material layer is disposed between a first substrate and a spaced apart second substrate of the liquid crystal display device.

In order to prevent damage from scratches or other potentially damaging events, a so-called, protection film is attached to an outside major lateral surface of a display panel after assembling the display panel. In one class of mass production process, significant amounts of static electricity (e.g., unfixed charged particles) are generated when attaching the protection film (or another such film) to the outside of its display panel due to material characteristics of the added film. This generated static electricity can adversely affect the operability of the display panel. More particularly, static electricity (currents of charged particles) may flow onto a sidewall surface of the display panel, and then, due to such flow, may adversely affect one or more color filters of the color filter layer. The static electricity may cause an undesired side effect wherein an overall displayed color of the display panel becomes too green overall.

Furthermore, when a simple light blocking member is formed in the peripheral region of the display panel, a light reflectance ratio of the same may be high so that a reflected light of the peripheral region interrupts an image produced by the display region.

Additionally, it is generally desirable to maximize the ratio of the display area (DA) of an LCD device versus its peripheral area (PA) and versus its substrate area so as to make maximum efficient use of the limited surface area provided by the substrates of the LCD device.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a display panel that is structured to reduce or prevent discoloration of its color filters by influx during mass production manufacture of discoloring static electricity.

In accordance with one aspect of the present disclosure of invention a method for manufacturing the above-mentioned display panel includes preventing formation of a low resistance pathway extending from an outer sidewall surface of the a base substrate to a color filters member where the base substrate is to have one or more, static electricity generating processes carried out on it and the static electricity generating processes can cause charged particles to flow along the outer sidewall surface of the a base substrate.

According to a more specific embodiment in accordance with the present disclosure, a display panel comprises a first substrate, a spaced apart second substrate and a liquid crystal layer interposed between the first and second substrates. The first substrate includes a first base substrate having a major lateral surface that is subdivided into a display region and a peripheral region. The display panel comprises further comprises: a color filter member disposed on the first base substrate and having a plurality of different color filters, a light blocking member disposed on and in the peripheral region of the first base substrate and composed of a conductive light blocking material, and an insulative overcoating member disposed on the color filter member and on the light blocking member and extending to cover a sidewall surface of the light blocking member such that static electricity cannot easily flow directly into the sidewall surface of the light blocking member and from there into the color filter member. The second substrate includes a second base substrate facing the first base substrate and a plurality of switching elements forming on the second base substrate.

In an example embodiment, the overcoating member may make direct contact with the first base substrate at a position corresponding to the sidewall surface of the light blocking member.

In an example embodiment, the color filter member and the light blocking member may be formed in a same layer.

In an example embodiment, the color filter member may be formed in the display region of the first base substrate.

In an example embodiment, the light blocking member may be formed so its sidewall surface is inwardly spaced from a sidewall surface of the first base substrate by a distance of about 200 um to about 500 um.

In an example embodiment, the display panel may further comprise a color blocking layer formed in the peripheral region of the first base substrate.

In an example embodiment, a sidewall surface of the color blocking layer faces toward an outside of the first substrate.

In an example embodiment, the color blocking layer comprises the same color filter material having a color corresponding to a highest resistance one of color filter materials used in the color filter member.

In an example embodiment, the color blocking layer comprises the color filter of a blue color.

In an example embodiment, the light blocking member is formed so as to be stacked on the color blocking layer.

In an example embodiment, the overcoating member makes contact with the color blocking layer.

In an example embodiment, the light blocking member is formed on an inside of the first base substrate so that the sidewall surface of the light blocking member is inward from the sidewall surface of the first base substrate by at least 200 um.

According to another example embodiment of the present disclosure, a method for manufacturing of a display panel comprises forming a light blocking member on a peripheral region of a first base substrate, the first base substrate including a display region and the peripheral region, forming a color filter member on the display region of the first base substrate, forming an overcoating layer on the light blocking member and on the color filter member, the overcoating layer extending to make contact with the first base substrate at a position corresponding to a sidewall surface of the light blocking member so as to thereby insulatively encase the sidewall surface of the light blocking member, combining a second base substrate with the first base substrate, the second base substrate including a plurality of switching elements and injecting a liquid crystal material between the first base substrate and the second base substrate.

According to example embodiments of the present disclosure, since the outer sidewall surface of the light blocking member is not exposed in coplanar relation with a sidewall surface of the first base substrate, when the display panel is later subjected to additional process that can cause static electricity particles to flow along the sidewall surface of the first base substrate, at least one of the insulative covering of and stepping back of the outer sidewall surface of the light blocking member helps to prevent a large influx of static electricity current from flowing through the light blocking member and into the color filter member.

Also, since in one embodiment, the color blocking layer and the light blocking layer are formed as stacked one on the other and in a peripheral region of the display panel, the stacked arrangement can decrease a reflectance ratio on a peripheral member of the display panel and can emphasize the light output of the display region of the liquid crystal panel to user over reflected light from the peripheral region.

BRIEF DESCRIPTION OF THE DRAWINGS

The above and other features and advantages of the present disclosure of invention will become more apparent by describing in detailed example embodiments thereof with reference to the accompanying drawings, in which.

DETAILED DESCRIPTION

Hereinafter, the present disclosure of invention will be provided in yet more detail with reference to the accompanying drawings.

Figure 1:
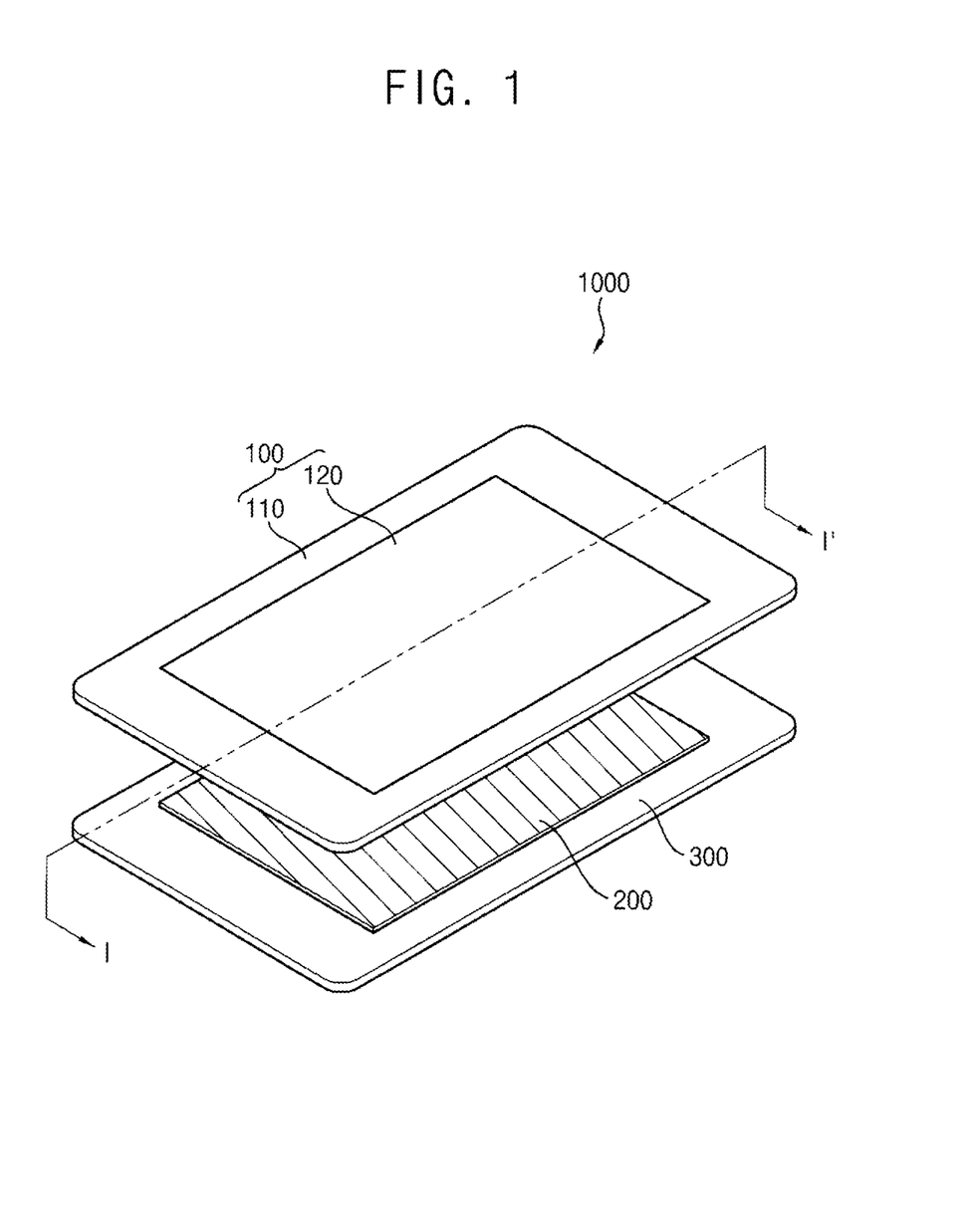
FIG. 1 is a perspective view illustrating a display panel according to an example embodiment of the present disclosure.

FIG. 1 is a perspective view of illustrating a display panel according to a first example embodiment.

Referring to FIG. 1, a display panel according to a first embodiment 1000 comprises a first substrate 100, a liquid crystal layer 200 and a second substrate 300. The first substrate 100 is combined with the second substrate 200 facing each other. The liquid crystal layer 200 is disposed between the first substrate 100 and the second substrate 200. The first substrate 100 includes a peripheral region (non-displaying peripheral area or PA) 110 and an image display region (display area DA) 120. The first substrate 100 includes a color filter member (not shown in FIG. 1), a light blocking member and an overcoating member on a first base substrate. The second substrate includes a second base substrate and a plurality of switching elements disposing on the second base substrate.

Various electronic apparatus (e.g., data line driver chips and/or gate line driver chips) for driving the display panel are disposed on the peripheral region 110 of the first substrate 100. When properly driven by these peripheral area (PA) driving means, the display panel in the display region 120 produces a desired image and exposes to an outside for viewing by a user.

Figure 2:
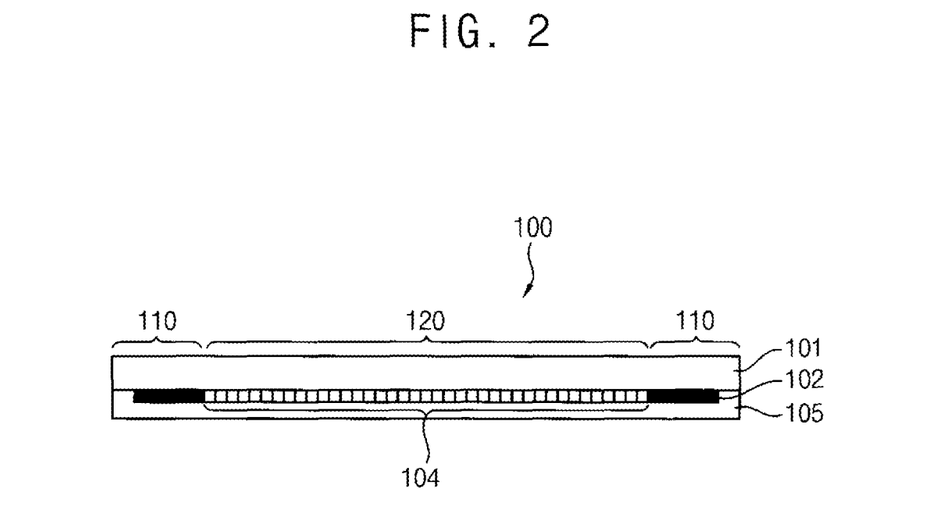
FIG. 2 is a cross-sectional view illustrating a first substrate taken along a line I-I' shown in FIG. 1.

FIG. 2 is a cross-sectional view illustrating a first substrate 100 in accordance with the present disclosure and taken along a line I-I' shown in FIG. 1.

Referring to FIG. 2, the illustrated first substrate 100 comprises: a first base substrate 101 having a respective first lateral extent, a color filter member 104 having a respective second lateral extent, a light blocking member 102 extending laterally and outwardly from the second lateral extent of the color filter member 104 but not all the way to the first lateral extent of the first base substrate and an overcoating member 105 that coats over the color filter member 104, the light blocking member 102 and the outer peripheral extent of the first base substrate 101 that is not covered by the light blocking member 102.

In FIG. 2, the portion of the first base substrate 101 that is not overlapped by the color filter member 104 is denoted as the peripheral region 110 and the remaining portion of the first base substrate that is overlapped by the color filter member 104 is denoted as the display region 120. The peripheral region 110 and the display region 120 thus divide the full lateral extent of the first substrate 100 into two regions. As shown, the color filter member 104 is disposed on the first base substrate 101. The color filter member 104 includes a plurality of different colored color filters (e.g., RGB). The light blocking member 102 is disposed on and within the peripheral region 110 of the first base substrate 101, but does extend laterally out to the full extent of the peripheral region 110. In other words, a gap is left between the outermost peripheral edge of the first base substrate 101 and the outermost peripheral edge of the light blocking member 102. The light blocking member 102 is composed of a material that blocks light. As shown, the overcoating member 105 covers the color filter member 104, the light blocking member 102 and the peripheral gap area of the first base substrate 101 that is not covered by the light blocking member 102.

In a conventional structure (not shown), generally, the overcoating member 105 is disposed only on the top major surface of the color filter member (similar to 104) (shown up side down in FIG. 2) and only on the top major surface of the light blocking member (similar to 102), but not along a sidewall surface of the light blocking member. Thus, the light blocking member (not shown) of the conventional device is disposed with an exposed sidewall surface positioned close conductive wirings and/or conductive frame members of the display device. Therefore, in the conventional structure, a static electricity which is inadvertently generated when an attaching a separate film (e.g., protection film) to the first substrate 100 flows into the light blocking member (similar, but not identical to 102) through its exposed sidewall. When such static electricity flows into the light blocking member, the static electricity can flow through the light blocking member so as to be coupled into the color filter member (similar to 104). When this happens, a color displayed by the color filter member can discolor to appear more green than desired. In other words, the color filter member is significantly discolored by having been subjected to an excessive amount of static electric current.

But, in the example embodiment of the present disclosure, the overcoating member 105 simultaneously covers and electrically insulates a sidewall surface of the light blocking member 102. By doing so, the overcoating member 105 reduces or blocks a possibility of influx of excessive static electricity that may otherwise discolor the color filter member 104.

In the example embodiment of the present disclosure, the color filter member 104 and the light blocking member 102 can be formed in a same layer. The color filter member 104 comprises differently colored color filters of three primary colors of more to thereby enable display of desired unique colors of a corresponding color gamut. The color filter 104 may include a black matrix having openings and differently colored color materials that fill respective openings within the black matrix. According to circumstances, some color materials are selectively not filled into particular openings of the black matrix, so that the respective color filter positions can be color filter spots which display a white light of a back light directly. Thus, the black matrix of the color filter member 104 and the light blocking member 102 can be disposed in a same layer.

The light blocking member 102 can be formed so as to be spaced apart from an outer edge of the first base substrate by a distance, in one embodiment, of about 200 um to about 500 um. Since the light blocking member 102 should not be directly exposed to an outside source of static electricity, the light blocking member 102 should be covered on its sidewall surfaces as well as its top major surface by the overcoating member 105. Thus, the light blocking member 102 is formed within an inside area of the first substrate 100, laterally spaced apart from the edge by a certain distance. A thickness of the light blocking member can be formed by about 1.0 um to about 1.5 um.

Figure 3:
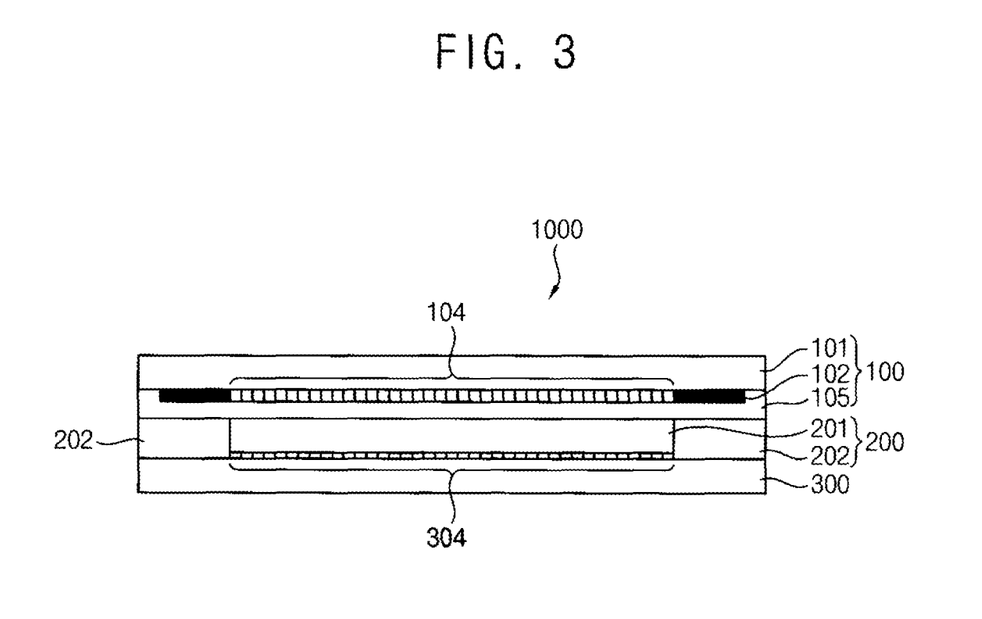
FIG. 3 is a cross-sectional view illustrating the display panel taken along a line I-I' shown in FIG. 1.

FIG. 3 is a cross-sectional view illustrating the display panel 1000 taken along a like I-I' shown in FIG. 1;

Referring to FIG. 3, the display panel 1000 according to an example embodiment of the present disclosure comprises the first substrate 100 of FIG. 2, combined with a liquid crystal layer 200 and a second substrate 300. The liquid crystal layer 200 is disposed between the first substrate 100 and the second substrate 300. The color filter member 104 is disposed on the first substrate 100. The second substrate 300 includes a plurality of switching elements 304 corresponding to the pixel unit areas of the color filter member 104. A transmittance ratio of a liquid crystal 201 presenting in the liquid crystal layer 200 can be decided according to a driving of the switching elements 304. Each of a different light corresponding to transmittance ratio of a respective pixel unit can be so driven, so that the display panel displays a desired image whose colors are defined by the color filters in the color filter member 104. A gap member 202 for maintaining a lateral gap between the liquid crystal region 201 and lateral edges of the first substrate 100 and of the second substrate 300 can be disposed in the liquid crystal layer 200.

Figure 4:
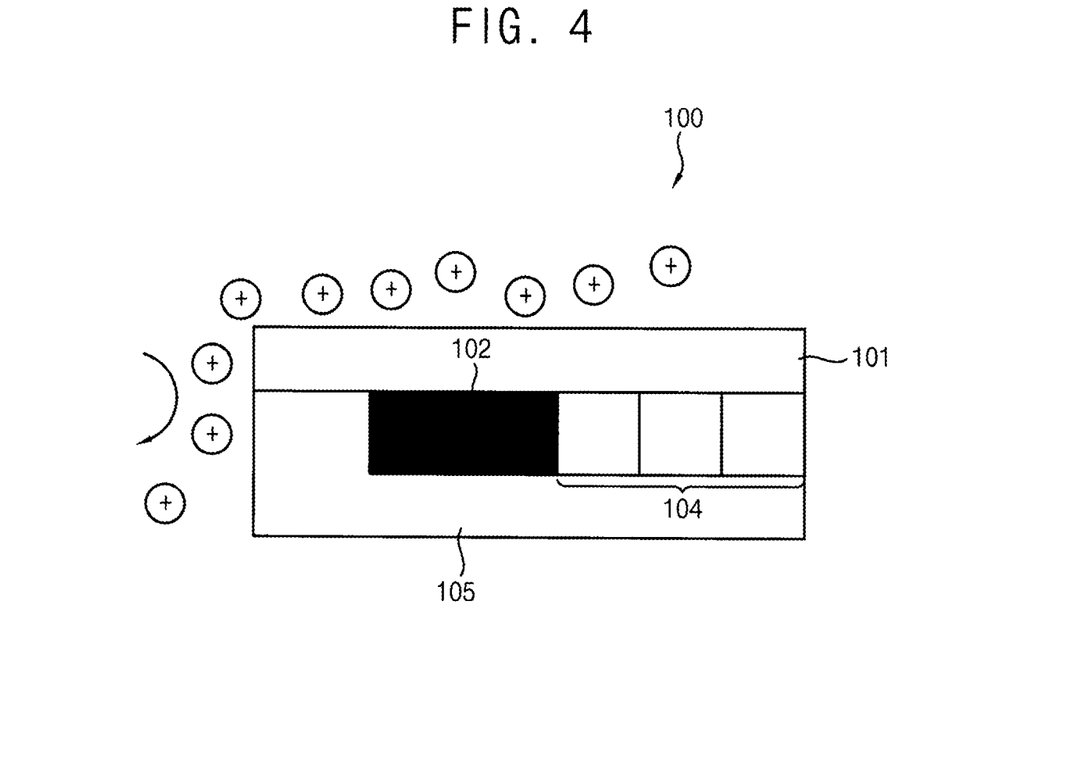
FIG. 4 is an enlarged cross-sectional view illustrating a portion of the first substrate shown in FIG. 2.

FIG. 4 is an enlarged cross-sectional view illustrating a portion of the first substrate shown in FIG. 2.

Referring to FIG. 4, the first substrate 100 of the display panel 1000 comprises the first base substrate 101, the color filter member 104, the light blocking member 102 and the overcoating layer 105. A function of each component has been mentioned above the description about FIG. 2 and thus will not be repeated. The first base substrate 101 of the first substrate 100 is a part that a display panel faces toward an outside, another film is further attached an outer surface of the first base substrate 101.

The protection film can be attached after forming a display panel by combining the first substrate 100 and the second substrate (not illustrated). When the film is attached, a static electricity (represented by moving charged particles in FIG. 4) can be generated near a surface of the first base substrate 101 of the first substrate 100. The film is attached at the first base substrate 101. The static electricity generated near a surface of the first base substrate 101 can be flowed adjacent to a sidewall surface of the first base substrate 101. However, the sidewall of the light blocking member 102 is spaced back from the sidewall surface of the first base substrate 101 and the electrically insulative overcoating layer 105 covers the sidewall surface of the light blocking member 102. Thus, the overcoating layer 105 blocks a direct flowing of the generated static electricity into the light blocking member 102 by way of its sidewall. Thus, a flowing of the static electricity into the color filter member 104 is blocked by the spacing back of and the overcoating of the sidewall of the light blocking member 102. Therefore, it prevents from damaging the color filter member 104 by the static electricity.

Figure 5:
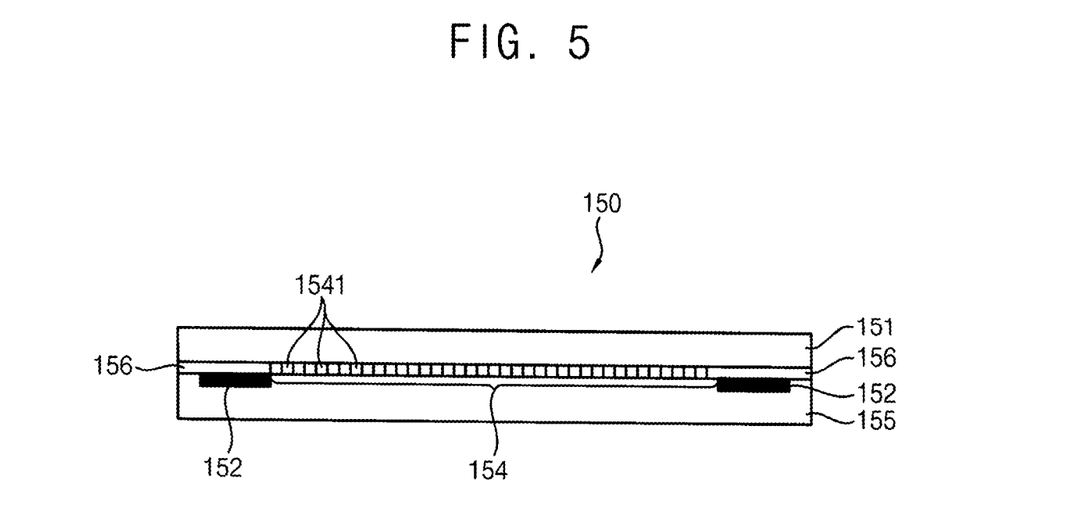
FIG. 5 is a cross-sectional view illustrating a display panel according to another example embodiment.

FIG. 5 is a cross-sectional view illustrating a display panel according to another example embodiment.

Referring to FIG. 5, a first substrate 150 according to another example embodiment of the present invention comprises a first base substrate 151, a color filter member 154, a light blocking member 152, a color blocking member 156 and an overcoating member 155. The color filter member 154 is disposed on the first base substrate 151, the color filter member 154 includes a plurality of color filters. The color blocking layer 156 is formed of an insulative material and is disposed in a peripheral region of the color filter member 154. The light blocking member 152 is disposed under the color blocking layer 156 (as seen in the orientation of FIG. 5). The light blocking member 152 is composed of a material (e.g., an opaque metal) that blocks light. The overcoating member 155 covers the color filter member 154, the color blocking layer 156 and the light blocking member 152 including an outward facing sidewall of the light blocking member 152.

A difference of the first substrate 150 according to the present example embodiment and the first substrate 100 of FIG. 2 is that of further including the color blocking layer 156. The color blocking layer 156 is formed in a same layer with the color filer member 104, the color blocking member 152 is disposed under (in FIG. 5) the color blocking layer 156. The overcoating member 155 covers the color filter member 154, the color blocking layer 156 and the light blocking member 152. Herein, the color blocking layer 156 is disposed on the first base substrate 151. The color blocking layer 156 is disposed with exposing to a side surface of the first substrate 150.

In the example embodiment of the present disclosure illustrated in FIG. 2, the overcoating layer 105 is disposed by making direct contact with the first base substrate 101, but in the second example embodiment of FIG. 5, the overcoating layer 155 is disposed by making contact with the color blocking layer 156. Thus, the light blocking member 152 is covered by the overcoating layer 155, but the sidewall surface of the color blocking layer 156 is exposed.

The color blocking layer 156 can be composed of a color filter material having a high electrical resistance. For instance, the color blocking layer 156 can be composed of a color filter material of a bluish color and having a relatively high electrical resistance (e.g., greater than that of greenish or reddish other color filter materials in the color filter member 154). Since the color blocking layer 156 disposing the color filter having a color corresponding to a high resistance, even though the static electricity flows from outside, the static electricity is not easily transferred inside. Thus, although the side surface of the first substrate 150 is exposed, the static electricity does not flow inside by way of the much more conductive color blocking layer 156.

The light blocking member 102 can be formed at an inside position of the first base substrate 101, in other words, spaced apart and inwardly of a side edge of the first base substrate 101 by about 200 um to about 500 um. The side surface of the first base substrate 101 and the side surface of the color blocking layer 156 are simultaneously exposed. Since the light blocking member 102 should not be exposed to an outside, the light blocking member 102 should be covered by the insulative overcoating member 105, so the light blocking member 102 should be formed an inside of the first substrate 100 by a certain distance. A thickness of the color blocking layer can be formed by about 1.0 um to about 2.0 um, a thickness of the light blocking member can be formed by about 1.0 um to about 1.5 um.

Thus, the color blocking layer 156 can be formed at the same time and by a same process as used for forming a relatively high resistance portion 1541 (e.g., the bluish color filters) of the color filter member 154. When forming a color filter member 154 and forming a color blocking layer are accomplished by one process, a number of a process can be decreased and a process can be simplified.

Thus, since the color blocking layer 156 and the light blocking member 152 are stacked one atop the other, a reflectance ratio of light inflowing from outside the display, onto the light blocking member 152 and back to the user can be decreased. Generally, when a light reflects too much in the peripheral region of the display panel, watching a screen displaying in the display region can be interrupted. Furthermore, to decrease a reflectance ratio of the peripheral region of the display panel is necessary, so the reflectance ratio in the peripheral member can be decreased by vertically stacking the color blocking layer (e.g., bluish color) and the light blocking member as shown in FIG. 5.

Figure 6:
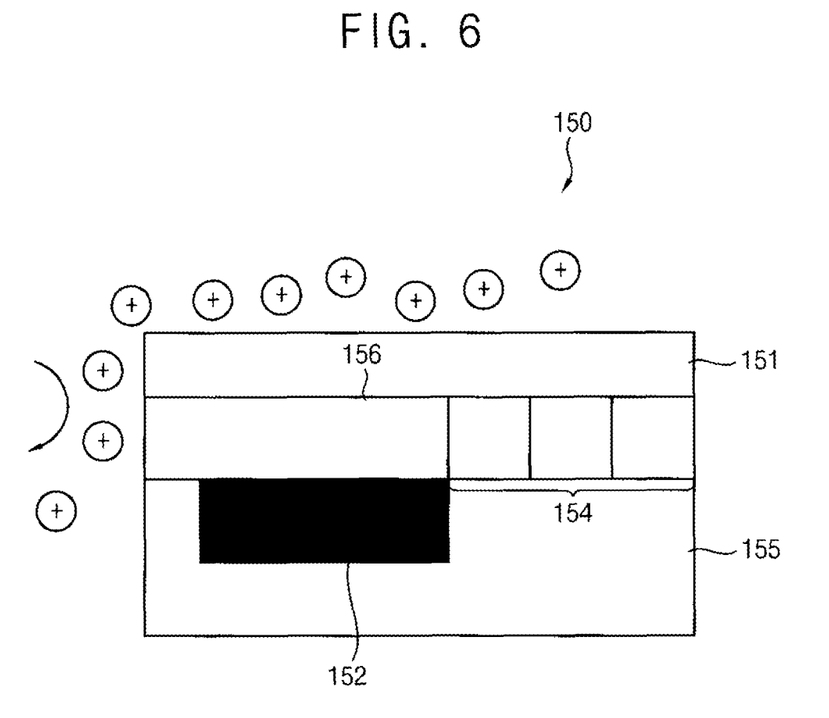
FIG. 6 is an enlarged cross-sectional view illustrating a portion of a first substrate of FIG. 5.

FIG. 6 is an enlarged cross-sectional view illustrating a portion of a first substrate of FIG. 5.

Referring to FIG. 6, a first substrate 150 of a display panel according to an example embodiment comprises a first base substrate 151, a color filter member 154, a light blocking member 152, a color blocking layer 156 and an overcoating layer 155. A function of each component has been mentioned above the description about FIG. 5 and as such will not be repeated. The first base substrate 151 of the first substrate 150 is a part that a display panel faces toward an outside, another film (not shown, e.g., protection film) is further attached an outer surface of the first base substrate 151.

When the film attached, a static electricity can be generated near a surface of the first base substrate 151 of the first substrate 150. The film is attached at the first base substrate 151. The static electricity generated near a surface of the first base substrate 151 can be flowed into a side surface of the first base substrate 151. However, the overcoating layer 155 covers the sidewall surface of the first base substrate 151 as well as sidewall surfaces of the color blocking layer 156 and of the color blocking layer 156. Thus, the overcoating layer 155 blocks flowing of the generated static electricity into the light blocking member 152. Therefore, it prevents from damaging the color filter member 154 by the static electricity.

Figure 7:
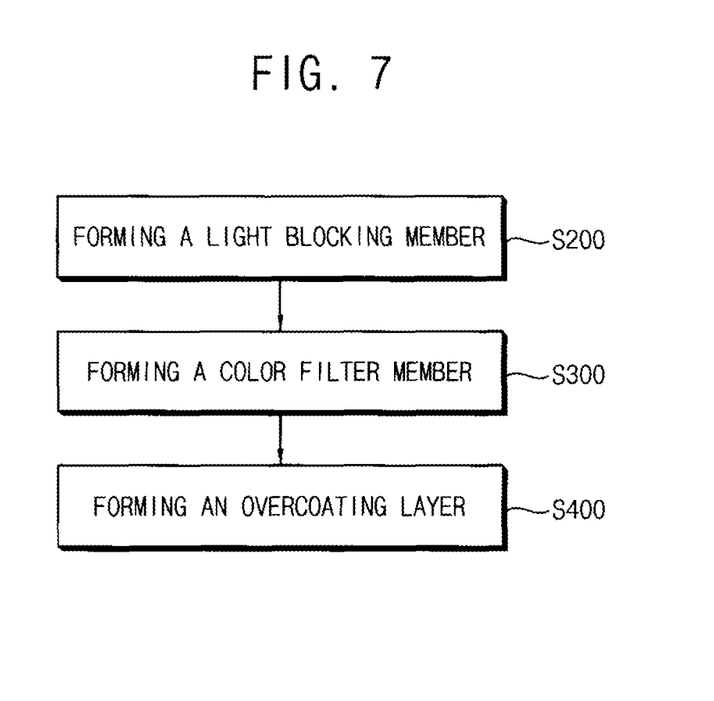
FIG. 7 is a flow chart illustrating a method for manufacturing of a display panel according to still another example embodiment.

FIG. 7 is a flow chart illustrating a method for manufacturing of a display panel according to still another example embodiment of the present invention.

Referring to FIG. 7, a method for manufacturing according to another example embodiment comprises forming a light blocking member S200, forming a color filter member S300, forming an overcoating layer S400, combining substrates (not shown in FIG. 7) and injecting a liquid crystal layer. The combining substrates and the injecting the liquid crystal layer are the same as general method for manufacturing of a liquid crystal display panel.

The forming of a metallic light blocking member S200 disposes the light blocking member in the peripheral region of the first base substrate but preferably spaced inwardly of the outer lateral edge of the base substrate. The forming a color filter member S300 disposes the color filter member in the display region of the first base substrate. Generally, the color filter member includes a black matrix with separate openings for ink jet or otherwise deposited and respective color materials of each respective color filter, where the color materials are presented as a matrix. When the light blocking member and the color blocking member formed from a same layer, the black matrix can be simultaneously disposed with the light blocking member in the forming the light blocking member S200. Thus, the light blocking member can be formed on an inside of the first base substrate from a side surface of the first base substrate by about 200 um to about 500 um.

In the forming an overcoating layer S400, the overcoating layer is disposed making contact with a sidewall surface of the light blocking member, where the latter is disposed on the first base substrate having the light blocking member and the color filter member. The light blocking member is not exposed at its sidewall surface thanks to the covering thereof by the overcoating layer. The effect that caused by non-exposure of the light blocking member is the same as mentioned above the example embodiment of FIG. 2.

Figure 8:
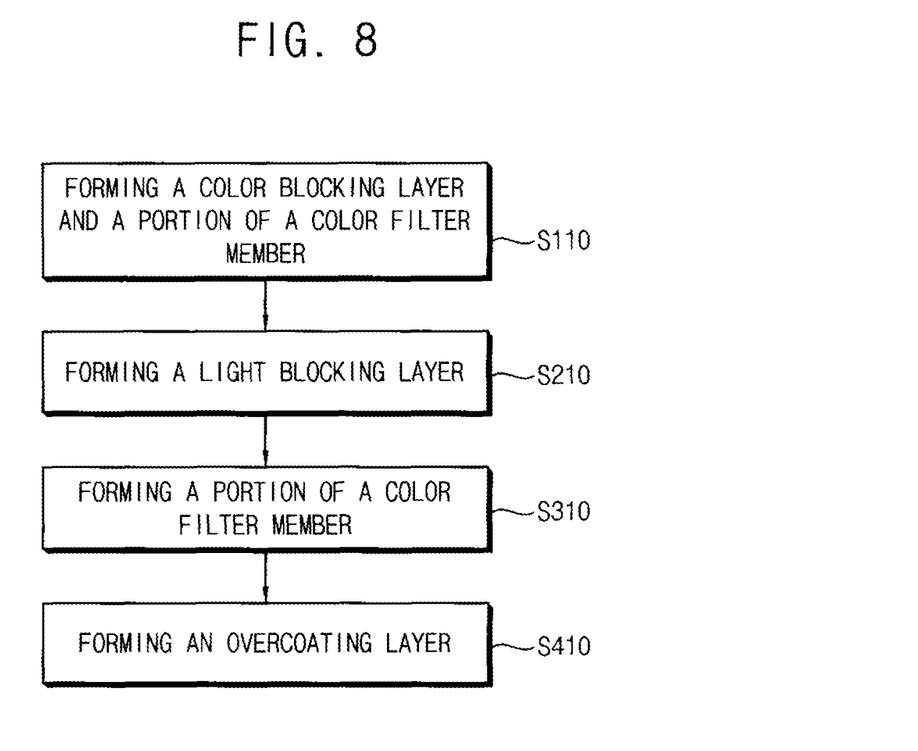
FIG. 8 is a flow chart illustrating a method for manufacturing of a display panel according to further still another example embodiment.

FIG. 8 is a flow chart illustrating a method for manufacturing of a display panel according to further still another example embodiment.

Referring to FIG. 8, a method for manufacturing a display panel according to an example embodiment comprises forming in a same process and in a same layer, a color blocking layer and a same colored portion (e.g., blue filters) of a color filter member S110, forming a light blocking member S210, forming another portion of the color filter member S310, forming an overcoating layer S410, combining substrates and injecting a liquid crystal layer. The combining substrates and the injecting the liquid crystal layer are the same as general method for manufacturing of a liquid crystal display panel.

In the forming a color blocking layer and a same colored portion of the color filter member S110, the color blocking layer can be simultaneously deposited (e.g., ink jet wise or other) with the color filter member. The color blocking layer can be used a color corresponding to a high resistance and a high reflectance ratio of the color filter member. Thus, a color filter of bluish color can be used. The color blocking layer and the portion of the color filter member should be formed from a same layer.

In the forming a light blocking member S210, the light blocking member is disposed in a peripheral region of the first base substrate. Since the color blocking layer already disposed in the peripheral region, the light blocking member is disposed as stacked on the color blocking layer.

In the forming another portion of a color filter member S310, the portion of a color filter member is disposed in the display region of the first base substrate. Since the portion of the color filter member is already disposed in the forming a color blocking layer S110, a color filter which is not formed yet, is disposed.

According to circumstances, the forming of the color blocking layer and the forming of the color filter member can be proceeded separately. The color blocking layer is only formed in the forming the color blocking layer S110, the color filter is separately formed in the forming the color filter member.

Generally, the color filter member includes a black matrix dividing each color filter and a color material presenting in each color matrix. If the light blocking member and the color filter member formed from a same layer, the black matrix can be simultaneously disposed with the light blocking member in the forming the light blocking member S210. Thus, in the forming the light blocking member S210, the light blocking member can be formed as spaced apart from an edge and thus more inside of the first base substrate by a spacing distance of about 200 um to about 500 um.

In the forming an overcoating layer S410, the overcoating layer is disposed making contact with sidewall surfaces of the light blocking member, the first base substrate and the color filter member. The light blocking member is not exposed to a side surface of the first base substrate thanks to the protection provided by the overcoating layer. A static electricity is not flowed in, because a high resistance of the color blocking layer is formed. The effect that caused by non-exposure of the light blocking member is the same as mentioned above the example embodiment of FIG. 6.

FIG. 9A to 9D are cross-sectional views illustrating a method for manufacturing of a display panel according to FIG. 8.

Figure 9A:
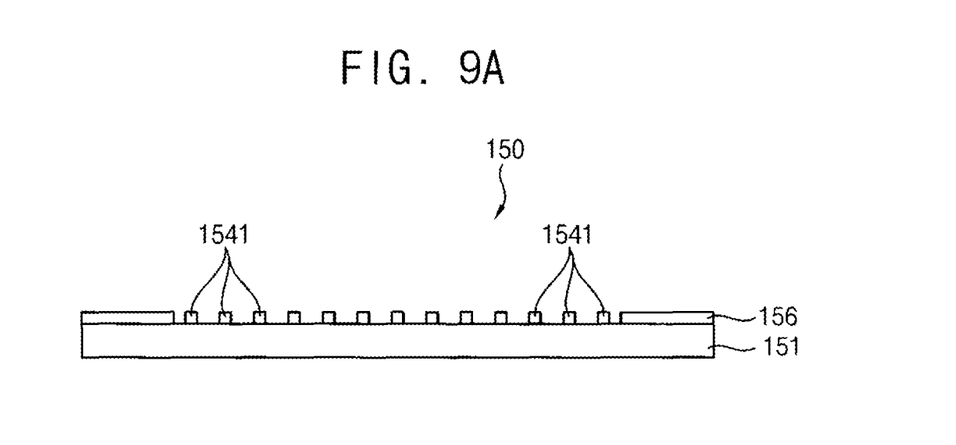
FIG. 9A to 9D are cross-sectional views illustrating a method for manufacturing of a display panel according to FIG. 8.

FIG. 9A is cross-sectional views illustrating forming S110 a part of a color blocking layer and a color filter member of a same colored filter material.

Referring to FIG. 9A, a color blocking layer 156 and a portion 1541 of a color filter member is disposed on the first base substrate 151 of the first substrate 150. The color blocking layer 156 and the color filter member 154 is formed from a same layer. When the color filter member 154 includes the color filter 1541 using the same color series as the color blocking layer 156, the light blocking member 156 can be disposed with same process. The color using in the color blocking layer 156 and the portion of the color filter member can be a bluish color.

Figure 9B:
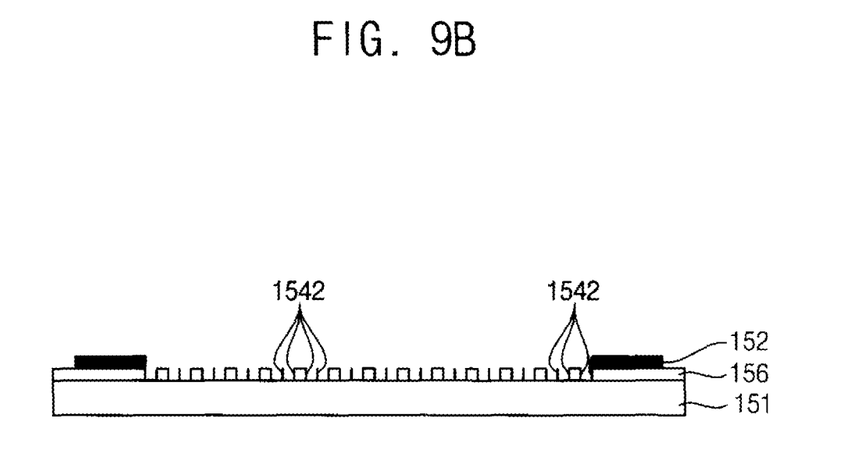

FIG. 9B is cross-sectional views illustrating forming S210 a light blocking member.

Referring to FIG. 9B, a light blocking member 156 is disposed (stacked) on a color blocking layer 156 forming on the first base substrate 151 of the first substrate 150. The color blocking layer 156 is disposed without reaching a side edge surface of the first base substrate. Instead, the light blocking member 156 is formed as spaced inwardly of the side edge surface of the first base substrate 151 by a certain distance. A reason that the light blocking member 152 formed at an inside position by a certain distance is that the light blocking member 156 should not be exposed to charged particles that move down a side edge of the first substrate 150 as an additional one or more protective or other layers (e.g., optical enhancement films) are attached.

Furthermore, the light blocking member 156 can be disposed with the same material as a black matrix forming in a color filter member 154 forming going forward. In this case, the light blocking member 156 can be simultaneously disposed with the black matrix 1542 of the color filter member.

Figure 9C:
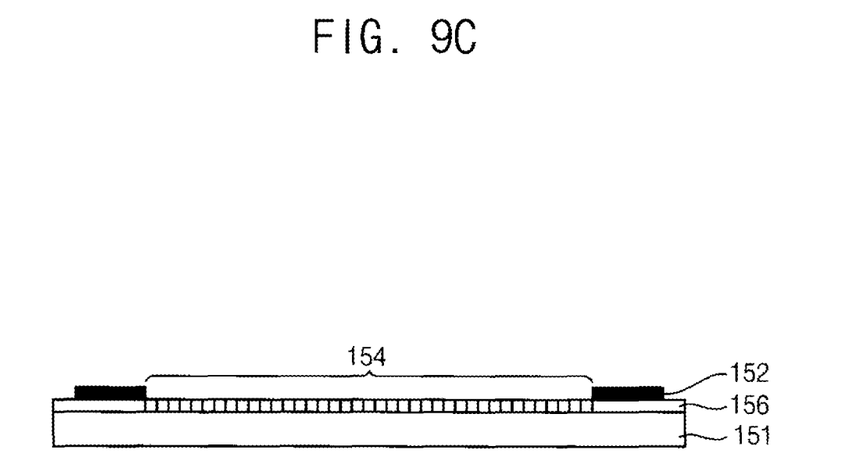

FIG. 9C is cross-sectional views illustrating forming S310 another part of a color filter member.

Referring to FIG. 9C, the color filter member 154 is completed by disposing a portion of the color filter member 154 which is forming on the first base substrate 151 of the first substrate 150. The black matrix of the color filter member 154 can be simultaneously disposed with the forming the light blocking member 156. Also, the black matrix of the color filter member 154 can be formed by a separate process. In this case, a process forming a black matrix of the color filter member 154 can be added.

Figure 9D:
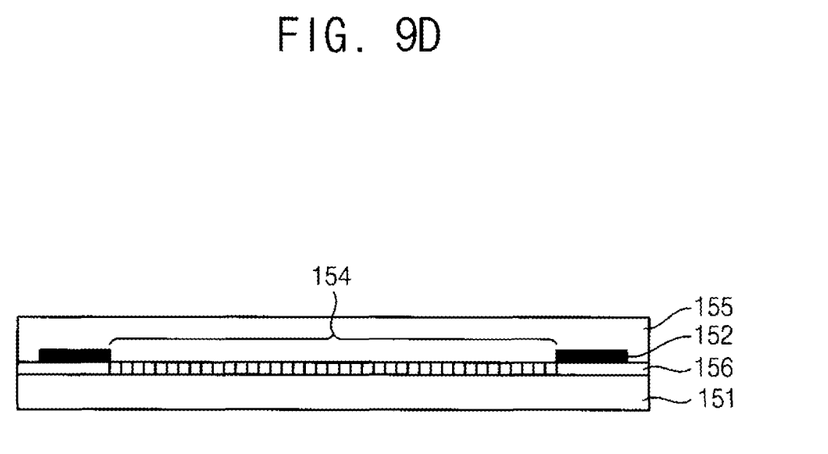

FIG. 9D is cross-sectional views illustrating forming S410 an overcoating layer 154.

Referring to FIG. 9D, an overcoating layer 155 is disposed on the color filter member 154, the color blocking member 156 and the light blocking member 152 of the first substrate 150. The overcoating layer 155 is disposed to cover at least a sidewall surface of the light blocking member 152 so that flow of a static electricity can be prevented to flow directly to and then though the light blocking member 152 so as to discolor the color filter member. Furthermore, since the color blocking member 156 has a characteristic corresponding to a high resistance, an influx of a large amount of static electricity does not need to be considered. Therefore, the overcoating layer 155 is disposed that having a same sidewall surface coplanar with the sidewall surface of the first base substrate 151. The overcoating layer 155 is disposed making contact with the color blocking member 156. Thus, since a peripheral region of a display panel includes not only a light blocking member 152 but also a color blocking member 156, a reflectance ratio of a peripheral region which is not displaying an image can be decreased.

According to an example embodiment of the present disclosure, since a light blocking member corresponding to a high electrical conductivity is not directly exposed at a sidewall surface of a display panel, it prevents the static electricity which can be generated near a top major surface of the panel and can seep down the sidewall surface of a display panel in the process of manufacturing of the panel from flowing inside into the light blocking member. Therefore, a discoloration of the color filter can be substantially reduced or prevented.

Thus, since a color blocking layer and a light blocking layer is simultaneously disposed (stacked) in a peripheral region of a display panel, a reflectance ratio of the peripheral region of the display panel can be decreased. Furthermore, it is advantageous to emphasize the display region of the liquid crystal panel to user.

The foregoing is illustrative of the present teachings and is not to be construed as limiting thereof. Although a few example embodiments in accordance with the present disclosure of invention have been described, those skilled in the art will readily appreciate from the foregoing that many modifications are possible in the example embodiments without materially departing from the novel teachings and advantages of the present disclosure. Accordingly, all such modifications are intended to be included within the scope of the present teachings. Therefore, it is to be understood that the foregoing is illustrative of the present teachings and is not to be construed as limited to the specific example embodiments disclosed, and that modifications to the disclosed example embodiments, as well as other example embodiments, are intended to be included within the scope of the teachings.

What is claimed is:

1. A display panel comprising:
    a first substrate including:
        a first base substrate having a laterally extending major surface subdivided into a display region and a peripheral region, the first base substrate also having a substantially vertically extending and respective, first sidewall surface;
        a color filter member disposed on the major surface of the first base substrate and having a plurality of differently colored color filters, wherein the color filter member is formed in the display region of the first base substrate;
        a light blocking member disposed on and within the peripheral region of the first base substrate and comprising a light blocking material, the light blocking member having a substantially vertically extending and respective, second sidewall surface; and
        an overcoating member disposed on the color filter member and on the light blocking member and extending to cover the second sidewall surface of the light blocking member; and
    a second substrate, spaced apart from the first substrate and including:
        a second base substrate having a laterally extending major surface also subdivided into a display region and a peripheral region, the second base substrate being aligned with the first base substrate; and
        a plurality of switching elements formed in the display region of the second base substrate; and
    a color blocking layer formed in the peripheral region of the first base substrate.

2. The display panel of claim 1, wherein the second sidewall surface of the light blocking member is spaced inwardly of the first sidewall surface of the first base substrate by about 200 um to about 500 um.

3. The display panel of claim 1, wherein the color blocking layer has a substantially vertically extending and respective, third sidewall surface, said third sidewall surface of the color blocking layer facing toward an outside of the first base substrate.

4. The display panel of claim 1, wherein the color blocking layer comprises a first color filter material having a higher electrical resistance than that of a different and second color filter material of the color filter member.

5. The display panel of claim 1, wherein the color blocking layer comprises the color filter material of a blue colored color filter of the color filter member.

6. The display panel of claim 1, wherein the light blocking member is formed stacked on the color blocking layer.

7. The display panel of claim 1, wherein the overcoating member makes contact with the color blocking layer.

8. A method for manufacturing of a display panel, the method comprising:
    providing a first base substrate having a laterally extending major surface subdivided into a display region and a peripheral region, the first base substrate also having a substantially vertically extending and respective, first sidewall surface;
    forming a light blocking member on and within the peripheral region of the first base substrate, the light blocking member comprising a light blocking material, the light blocking member having a substantially vertically extending and respective, second sidewall surface;
    forming a color filter member on and within the display region of the first base substrate, the color filter member having a plurality of differently colored color filters;
    forming a laterally extending overcoating layer on the light blocking member and on the color filter member, the overcoating layer extending to cover the second sidewall surface of the light blocking member;
    combining a second base substrate with the first base substrate, the second base substrate having a laterally extending major surface also subdivided into a display region and a peripheral region, the second base substrate being aligned with the first base substrate and the second base substrate including a plurality of switching elements formed in the display region of the second base substrate; and
    prior to forming the light blocking member, forming a color blocking layer on and within the peripheral region of the first base substrate, the color blocking layer having a substantially vertically extending and respective, third sidewall surface, said third sidewall surface of the color blocking layer facing toward an outside of the first base substrate.

9. The method of claim 8, wherein the color blocking layer comprises a first color filter material having a higher electrical resistance than that of a different and second color filter material of the color filter member.

10. The method of claim 8, wherein the color blocking layer comprises a material of a blue colored color filter of the color filter member.

11. The method of claim 8, wherein the forming of the color blocking layer comprises forming with a same process and in a same layer, a portion of the color filter member having a same material as that of the color blocking layer.

12. The method of claim 11, wherein the portion of the color filter member formed in the same process with the color blocking layer has a blue color.

* * * * *